(12) United States Patent
Takahashi et al.

(10) Patent No.: US 9,225,219 B2
(45) Date of Patent: Dec. 29, 2015

(54) DYNAMOELECTRIC MACHINE

(75) Inventors: Kenichi Takahashi, Tokyo (JP);
Hideyuki Hayashi, Tokyo (JP);
Toshiaki Kashihara, Tokyo (JP);
Katsuya Akamatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 864 days.

(21) Appl. No.: 12/093,568

(22) PCT Filed: Mar. 23, 2007

(86) PCT No.: PCT/JP2007/056043
§ 371 (c)(1),
(2), (4) Date: May 13, 2008

(87) PCT Pub. No.: WO2008/117376
PCT Pub. Date: Oct. 2, 2008

(65) Prior Publication Data
US 2010/0176684 A1 Jul. 15, 2010

(51) Int. Cl.
*H02K 5/00* (2006.01)
*H02K 5/24* (2006.01)
*H02K 5/15* (2006.01)
*H02K 5/26* (2006.01)

(52) U.S. Cl.
CPC .. *H02K 5/00* (2013.01); *H02K 5/24* (2013.01); *H02K 5/26* (2013.01)

(58) Field of Classification Search
USPC ............ 310/91, 216.129, 400, 402, 406–410, 310/413, 414, 216.134
See application file for complete search history.

(56) References Cited

U.S. PATENT DOCUMENTS 917,188 A * 4/1909 Tirrill .............................. 310/91
4,028,568 A * 6/1977 Tatsumi et al. ............... 310/410
(Continued)

FOREIGN PATENT DOCUMENTS

JP 08-070554 A 3/1996
JP 2001-251823 A 9/2001
(Continued)

OTHER PUBLICATIONS

Japanese Office Action Dated Feb. 8, 2011.

*Primary Examiner* — Burton Mullins
(74) *Attorney, Agent, or Firm* — Sughrue Mion, PLLC; Richard C. Turner

(57) ABSTRACT

An alternator according to the present invention includes: a shaft; a rotor that is fixed to the shaft; a stator that has a stator core that is disposed so as to surround an outer circumference of the rotor and in which a plurality of slots that extend axially are formed so as to be spaced apart circumferentially; and a front bracket and a rear bracket that hold circumferential edge portions of the stator core from two axial ends using a plurality of holding means and that envelope the stator core, a pair of first stays that are formed on the front bracket being fixed to a vehicle by bolts that penetrate through a pair of penetrating apertures that are respectively formed on the first stays, and the pair of penetrating apertures are formed at positions such that an approximate perpendicular bisector of a straight line that connects centers of the penetrating apertures intersects an axis of the shaft; and one of the holding means is disposed on the perpendicular bisector near the shaft. This configuration can prevent generation of magnetic noise without increasing weight in the brackets, in other words, without increasing overall weight.

3 Claims, 7 Drawing Sheets

(56) References Cited

U.S. PATENT DOCUMENTS

| | | | |
|---|---|---|---|
| 4,288,712 A * | 9/1981 | Hagenlocher et al. | 310/91 |
| 5,686,773 A | 11/1997 | Sakakibara et al. | |
| 5,705,870 A * | 1/1998 | Thomsen et al. | 310/91 |
| 5,760,513 A * | 6/1998 | Morishita et al. | 310/91 |
| 5,832,983 A * | 11/1998 | Kuroda et al. | 164/342 |
| 6,424,073 B1 | 7/2002 | Kometani et al. | |
| 6,504,280 B2 * | 1/2003 | Trowbridge | 310/91 |

FOREIGN PATENT DOCUMENTS

| | | |
|---|---|---|
| JP | 2002-136032 A | 5/2002 |
| JP | 3490659 B2 | 11/2003 |
| JP | 2005269756 | 9/2005 |
| JP | 2006271061 | 10/2006 |

\* cited by examiner

DYNAMOELECTRIC MACHINE

TECHNICAL FIELD

The present invention relates to a dynamoelectric machine that includes a first bracket and a second bracket that envelope a stator core, and that is fixed to a mount body by a fastening means that penetrates through penetrating apertures of a pair of stays that are formed on the first bracket.

BACKGROUND ART

In recent years, demand for quieter vehicles has been increasing, and demand for noise reduction in vehicle parts has become very immediate. Particularly in auxiliary machines that rotate at comparatively high speeds, especially automotive alternators, there is an urgent need for reductions in magnetic noise that is generated as a result of power generation and that constitutes one cause of noise generation.

Known examples of automotive alternators that are aimed at preventing such generation of magnetic noise include the automotive alternator that is described in Japanese Patent Laid-Open No. HEI 8-7-554 (Gazette), for example.

That generator includes: a shaft; a rotor that is fixed to the shaft; a stator that has a stator core that is disposed so as to surround an outer circumference of the rotor and in which a plurality of slots that extend axially are formed so as to be spaced apart circumferentially; and a front bracket and a rear bracket that hold circumferential edge portions of the stator core from two axial ends using a plurality of holding means and that envelope the stator core, wherein a pair of stays that are formed on the front bracket are fixed to a vehicle by a fastening means that penetrates through a pair of penetrating apertures that are respectively formed on the stays.

In the case of that generator, propagation of vibrations from the engine through the stays to the bracket is reduced by disposing reinforcing ribs on the stays that are formed on the front bracket and the rear bracket to reinforce the strength of the bracket, and amplification of magnetostriction is suppressed and generation of unpleasant magnetic noise is prevented by preventing deformation of the bracket and the stator core that deform as a result of such vibrations.

DISCLOSURE OF THE INVENTION

Problem to be Solved by the Invention

However, in automotive alternators that have the above configuration, because reinforcing ribs are disposed on the bracket, some problems have been that the overall weight of the generator is increased significantly, which runs counter to current needs where reductions in size and weight are desirable, and weight increases in the bracket may also lead to cost increases.

The present invention aims to solve the above problems and an object of the present invention is to provide a dynamoelectric machine that can prevent generation of magnetic noise without increasing weight in a bracket, in other words, without increasing overall weight.

Means for Solving the Problem

In order to achieve the above object, according to one aspect of the present invention, there is provided a dynamoelectric machine including: a shaft; a rotor that is fixed to the shaft; a stator that has a stator core that is disposed so as to surround an outer circumference of the rotor and in which a plurality of slots that extend axially are formed so as to be spaced apart circumferentially; and a first bracket and a second bracket that hold circumferential edge portions of the stator core from two axial ends using a plurality of holding means and that envelope the stator core, a pair of first stays that are formed on the first bracket being fixed to a mount body by a fastening means that penetrates through a pair of penetrating apertures that are respectively formed on the first stays, the dynamoelectric machine being characterized in that: the pair of penetrating apertures are formed at positions such that an approximate perpendicular bisector of a straight line that connects centers of the penetrating apertures intersects an axis of the shaft; and one of the holding means is disposed on the perpendicular bisector near the shaft.

Effects of the Invention

A dynamoelectric machine according to the present invention can prevent generation of magnetic noise without increasing weight in the brackets, in other words, without increasing overall weight.

BEST MODE FOR CARRYING OUT THE INVENTION

Automotive alternators according to respective preferred embodiments of the present invention will be explained below based on the drawings, and identical or corresponding members and portions in each of the drawings will be given identical numbering.

Embodiment 1

Figure 1:
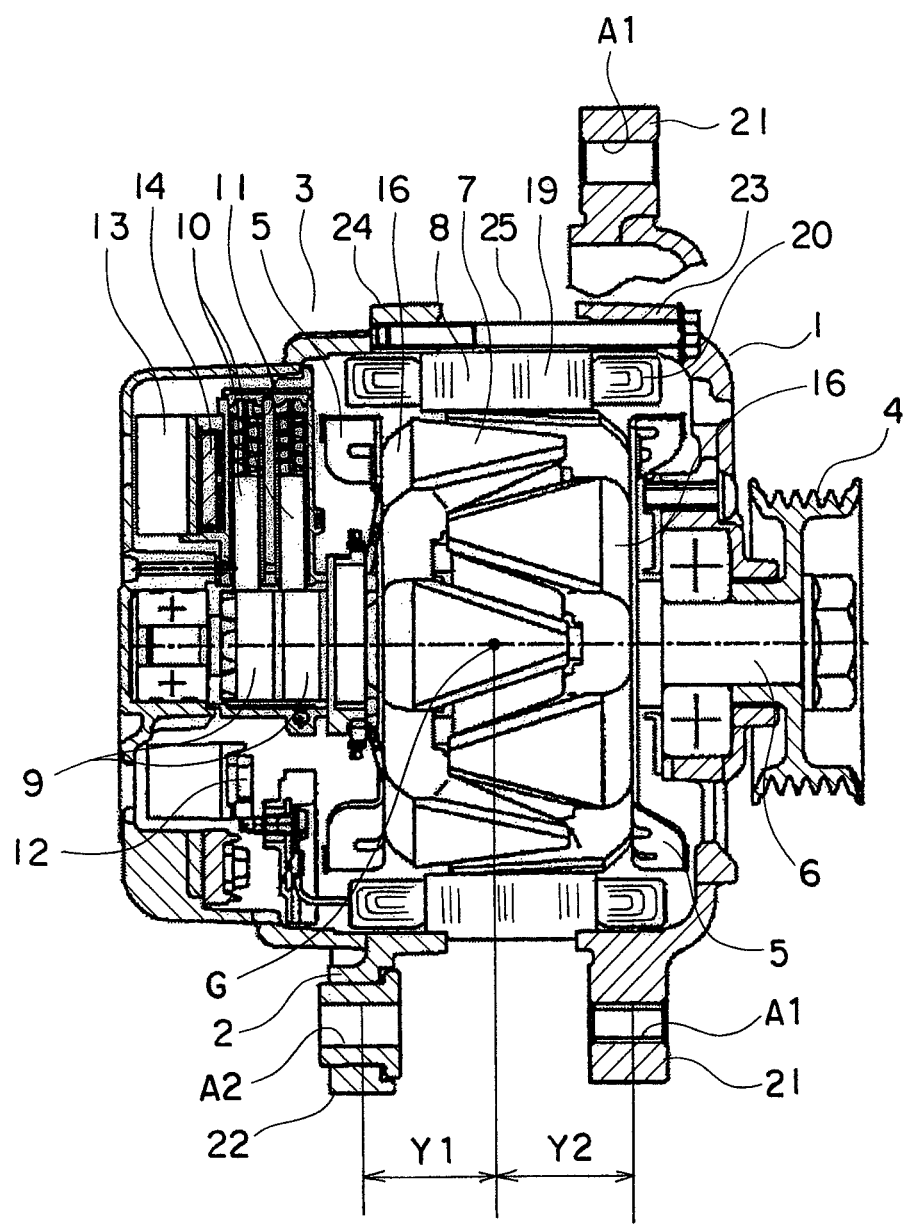
FIG. 1 is a cross section that shows an automotive alternator according to Embodiment 1 of the present invention.
Figure 2:
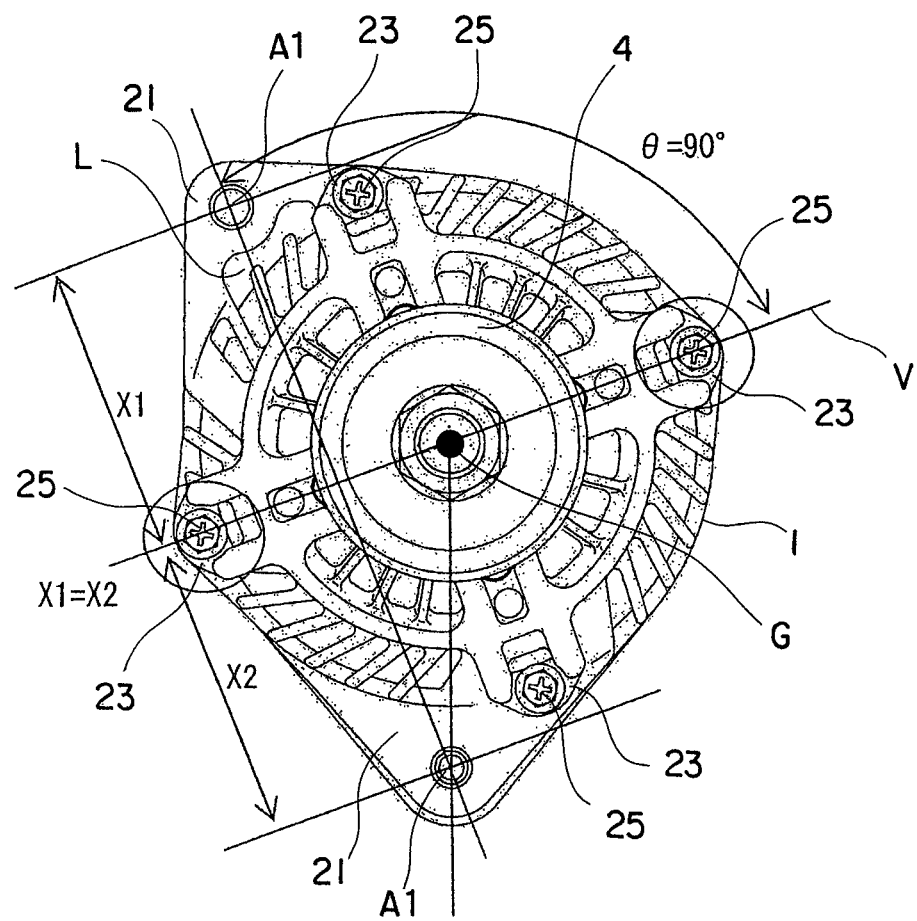
FIG. 2 is a diagram of the automotive alternator in FIG. 1 when viewed from a front bracket end.

FIG. 1 is a cross section that shows an automotive alternator (hereinafter simply "alternator") according to Embodiment 1 of the present invention, and FIG. 2 is a front elevation of the automotive alternator in FIG. 1 when viewed from an end near a front bracket 1.

This alternator, which constitutes a dynamoelectric machine, includes: a case 3 that is constituted by a front bracket 1 and a rear bracket 2; a shaft 6 that is disposed inside the case 3 and that has a pulley 4 fixed to a first end portion; a Lundell rotor 7 that is fixed to the shaft 6; fans 5 that are fixed to two end surfaces of the rotor 7; and a stator 8 that is fixed to an inner wall surface of the case 3.

The alternator also includes slip rings 9 that are fixed to a second end portion of the shaft 6 so as to supply electric current to the rotor 7; a pair of brushes 10 that slide on the slip rings 9; a brush holder 11 that houses the brushes 10; a rectifier 12 that is electrically connected to the stator 8 so as to rectify alternating current that is generated in the stator 8 into direct current; a heatsink 13 that is fitted into the brush holder 11; and a regulator 14 that is fixed adhesively to the heatsink 13 and that adjusts magnitude of an alternating-current voltage that arises in the stator 8.

Figure 3:
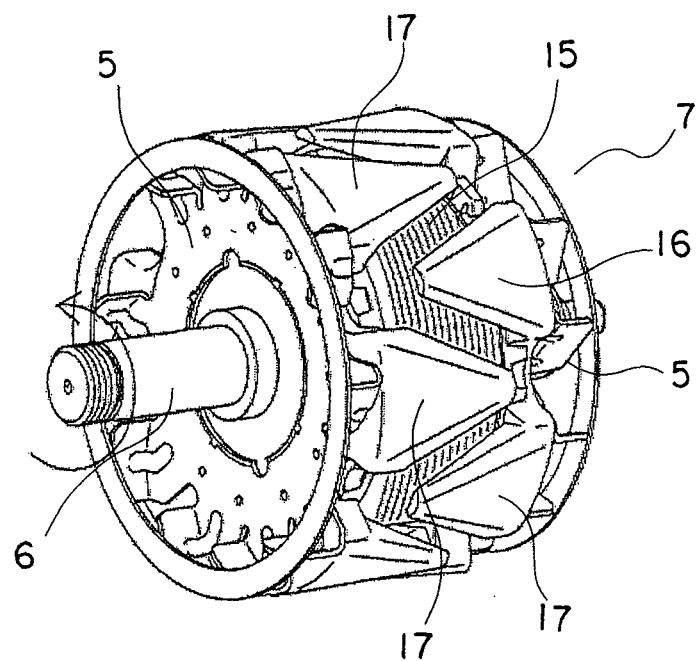
FIG. 3 is a perspective that shows a rotor from FIG. 1.

As shown in FIG. 3, the rotor 7 is constituted by: a rotor coil 15 that generates magnetic flux on passage of electric current; and a pair of pole cores 16 that are disposed so as to cover the rotor coil 15 and in which magnetic poles are formed by the magnetic flux. The pair of pole cores pole cores 16 are made of iron, and are fixed to the shaft 6 such that eight claw-shaped magnetic poles 17 on each that extend axially at a uniform angular pitch circumferentially face each other so as to intermesh with each other.

Figure 4:
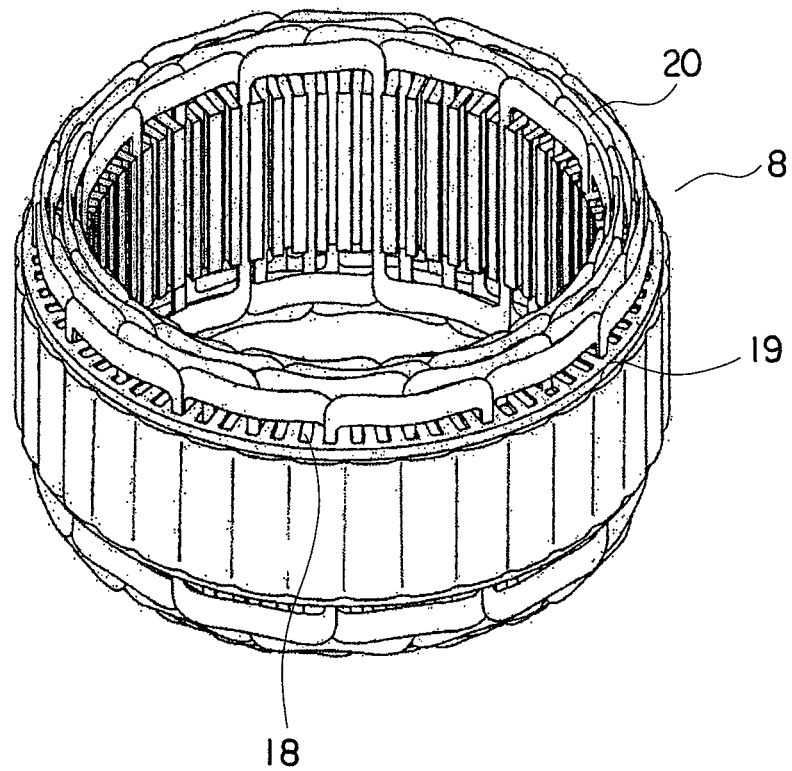
FIG. 4 is a perspective that shows a stator from FIG. 1.

As shown in FIG. 4, the stator 8 includes: a stator core 19 that is constituted by a cylindrical laminated core in which a plurality of slots 18 that extend axially are formed at a predetermined pitch circumferentially; and a stator winding 20 that is installed in the stator core 19.

Figure 5:
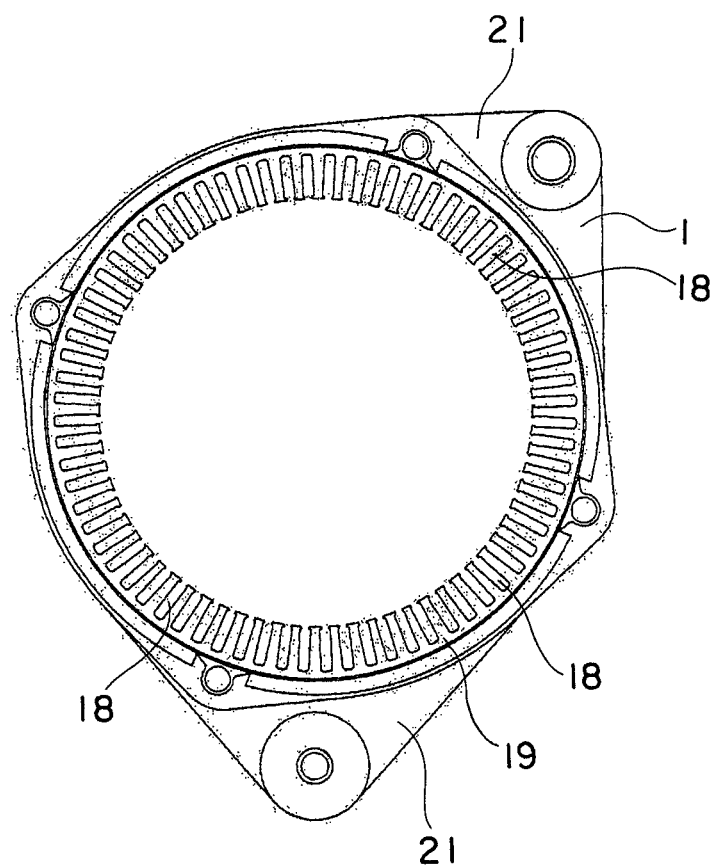
FIG. 5 is a diagram of a stator core inside a front bracket end of FIG. 1 when viewed from a rear bracket.

As shown in FIG. 5, the slots 18 are formed at a uniform pitch circumferentially.

The front bracket 1, which constitutes a first bracket, and the rear bracket 2, which constitutes a second bracket, are each formed integrally by aluminum die casting. Both brackets 1 and 2 are made of aluminum in order to reduce weight.

A pair of front stays 21 and 21 that project radially and that constitute first stays are formed on the front bracket 1. A rear stay 22 that constitutes a second stay is formed on the rear bracket 2 so as to face one of the front stays 21. A pair of front-end penetrating apertures A1 are formed on the respective front stays 21 and 21, and a rear-end penetrating aperture A2 is also formed on the rear stay 22.

The rear-end penetrating aperture A2 faces one front-end penetrating aperture A1. The alternator is mounted to a vehicle by passing a bolt (not shown) that constitutes a fastening means simultaneously through that front-end penetrating aperture A1, an aperture (not shown) of a vehicle mount portion that constitutes a mount body, and the rear-end penetrating aperture A2 and fastening the bolt, and also by passing a bolt through the remaining front-end penetrating aperture A1 and screwing the bolt directly into the vehicle.

Moreover, the stays 21 and 22 are disposed such that a line that extends radially through a center of gravity G of the alternator passes through an intermediate point (Y1=Y2) of the distance between the stays 21 and 22.

Bolt fastening portions 23 and 24 are formed on circumferential edge portions of the front bracket 1 and the rear bracket 2, respectively, so as to be at a uniform angular pitch of 90 degrees circumferentially. Fastening apertures are formed on the respective bolt fastening portions 23 and 24, which are thicker than the circumferential edge portions. Two edge portions on an outer circumference of the stator core 19 are placed in contact with end surfaces of the front bracket 1 and the rear bracket 2, respectively, and the stator core 19 is held firmly by the front bracket 1 and the rear bracket 2 by passing bolts 25 through the fastening apertures of the bolt fastening portions 23 and 24 and fastening them. Because the end surfaces of the front bracket 1 and the rear bracket 2 contact the stator core 19 directly, heat that is generated in the stator core 19 is transferred efficiently to the front bracket 1 and the rear bracket 2.

In an automotive alternator of the above configuration, electric current is supplied from a battery (not shown) through the brushes 10 and the slip rings 9 to the rotor coil 15, generating magnetic flux. Claw-shaped magnetic poles 17 of one pole core 16 are magnetized into North-seeking (N) poles by this magnetic flux, and claw-shaped magnetic poles 17 of the other pole core 16 are magnetized into South-seeking (S) poles. At the same time, rotational torque from an engine is transmitted through a belt and the pulley 4 to the shaft 6, rotating the rotor 7.

As a result, a rotating magnetic field is applied to the stator winding 20, generating electromotive force in the stator winding. Magnitude of the alternating-current electromotive force is adjusted by the regulator 14, which adjusts current flowing to the rotor 7. Alternating current that is generated by the alternating-current electromotive force also passes through the rectifier 12 and is rectified into direct current, and the battery is charged.

Now, when an automotive alternator is mounted to a vehicle, displacement of the bracket when vibrations from the engine propagate through the stays to the bracket can normally be kept to a minimum by mounting the alternator such that its center of gravity is placed on a straight line that connects the front-end penetrating apertures A1 that are respectively formed on the front stays 21.

However, it is often difficult to mount the alternator such that its center of gravity is placed on the above straight line due to layout relationships with other auxiliary machinery that is fixed to the vehicle.

In such cases, when vibrational acceleration that results from engine vibration is applied to the alternator, the largest displacements occur in an axial direction of the shaft 6 at portions that are farthest away from supported points that are constituted by the bolts that pass through the penetrating apertures A1 and A2.

In this embodiment, as shown in FIG. 2, the front bracket 1 and the rear bracket 2 are disposed at a position where an approximate perpendicular bisector V of a straight line L that connects centers of the pair of penetrating apertures A1 that are formed on the front stays 21 and 21 and an axis of the shaft 6 intersect.

Consequently, because distances that connect the center of gravity G of the alternator and the pair of penetrating apertures A1 above the axis of the shaft 6 are equal and the loads that act on the stays 21 and 22 are equal, the pair of stays 21 and 21 may have equal thickness dimensions, enabling the stays 21 and 21 to be configured without excessive weight increases.

The bolt fastening portions 23 and 24 are disposed on portions that are farthest away from the bolts that constitute the supported points at which the penetrating apertures A1 pass through, and the stator core 19 is held by the front bracket 1 and the rear bracket 2 by fastening the bolts 25 at these bolt fastening portions 23 and 24.

In FIG. 2, the bolt fastening portions 23 and 24 that are positioned near the shaft 6 from the straight line L that connects the centers of the pair of penetrating apertures A1 are portions that are displaced furthest in an axial direction of the shaft 6, which is vertical relative to the surface of the page, but because the stator core 19 is held by and integrated firmly with the front bracket 1 and the rear bracket 2 by the bolts 25 at these portions, resistance to vibrations from the engine at the portions of the bracket 1 and 2 that hold the stator core 19 is improved.

In other words, vibrations from the engine propagate to the bracket 1 and 2 through the stays 21 and 22, but deformation of the bracket 1 and 2 and the stator core 19 that results from the vibrations is suppressed, enabling amplification of magnetostriction to be suppressed and the generation of unpleasant magnetic noise to be prevented.

Vibrations are generated when the rotor 7 of the alternator rotates at high speed due to radial imbalances in the rotor 7 and the mass of the rotor 7, but because vibration resistance at the above portions that are held between the front bracket 1 and the rear bracket 2 is improved, it is not necessary to completely eliminate radial imbalances in the rotor 7, making high-precision adjustment of imbalances in the rotor 7 unnecessary.

Because the stator core 19 is held and fixed firmly, displacement of the stator core 19 is suppressed even if vibrations from the engine and vibrations due to imbalances in the rotor 7 do occur, and the stator core 19 and the brackets 1 and 2 are also placed in close contact at the holding portions, enabling heat from the stator core 19 to be transferred efficiently to the brackets 1 and 2.

In addition, because the center of gravity G of the alternator (on the axis of the shaft 6) is to the right of the straight line L in FIG. 2, torque acts on the stator core 19 in a clockwise direction, but because the bolt fastening portions 23 and 24 are disposed at a uniform angular pitch of 90 degrees and the bolt fastening portions 23 are disposed near the center of gravity G and also away from the center of gravity G, the stator core 19 is held firmly between and by the front bracket 1 and the rear bracket 2 by means of the bolts 25 at the bolt fastening portions 23, also suppressing circumferential displacement of the stator core 19. Consequently, magnetic noise is further reduced.

In addition, because the stays 21 and 22 are disposed such that a line that extends radially through the center of gravity G of the alternator passes through an intermediate point (Y1=Y2) of the distance between the stays 21 and 22, the alternator is fixed stably to the vehicle and resistance to vibrations from the engine is also improved.

Embodiment 2

Figure 6:
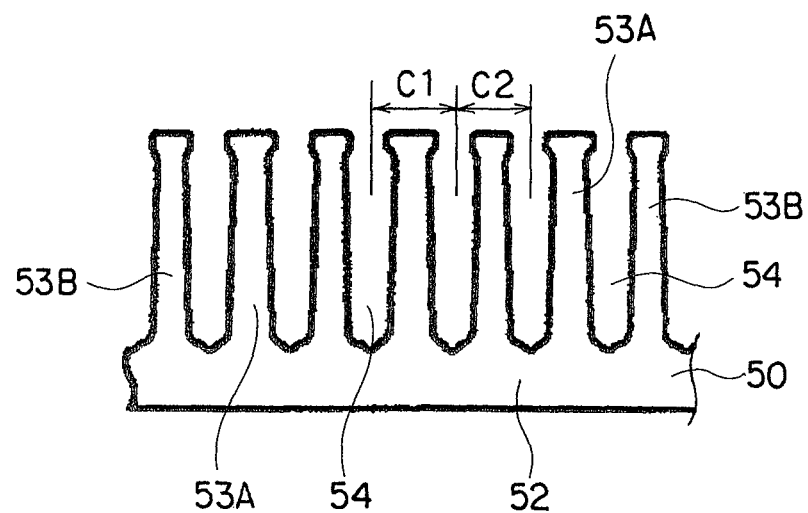
FIG. 6 is an explanatory diagram in which a stator core of an alternator according to Embodiment 2 of the present invention is shown flattened out.
Figure 7:
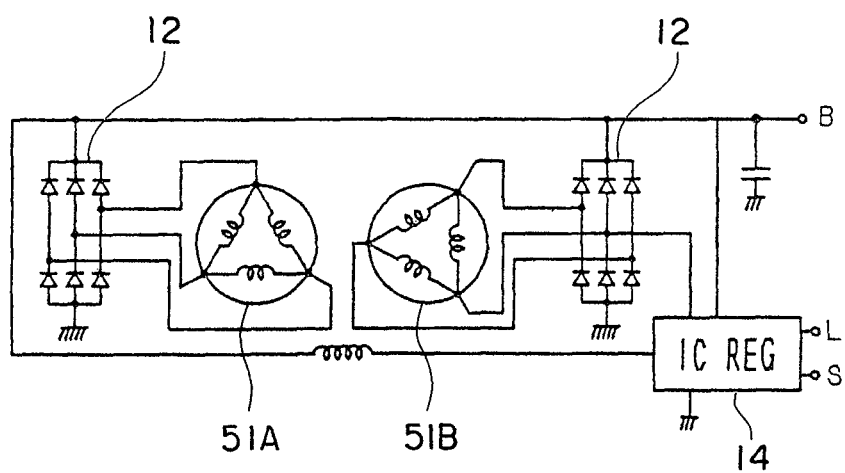
FIG. 7 is an electrical circuit diagram for the automotive alternator in FIG. 6.

FIG. 6 is an explanatory diagram in which a stator core 50 of an alternator according to Embodiment 2 of the present invention is shown flattened out, and FIG. 7 is an electrical circuit diagram for this alternator.

An alternator according to this embodiment is an alternator in which the number of slots is two slots per phase per pole, specifically, the number of slots is 72 and the number of magnetic poles is twelve poles.

In a stator core 50 according to this embodiment, a first three-phase stator winding 51A and a second three-phase stator winding 51B are installed, in which conducting wires are wound so as to have a phase difference of 32.5 electrical degrees. This stator core 50 is constituted by: an annular core back 52; and wide teeth 53A and narrow teeth 53B that extend radially inward from the core back 52.

Figure 2A:
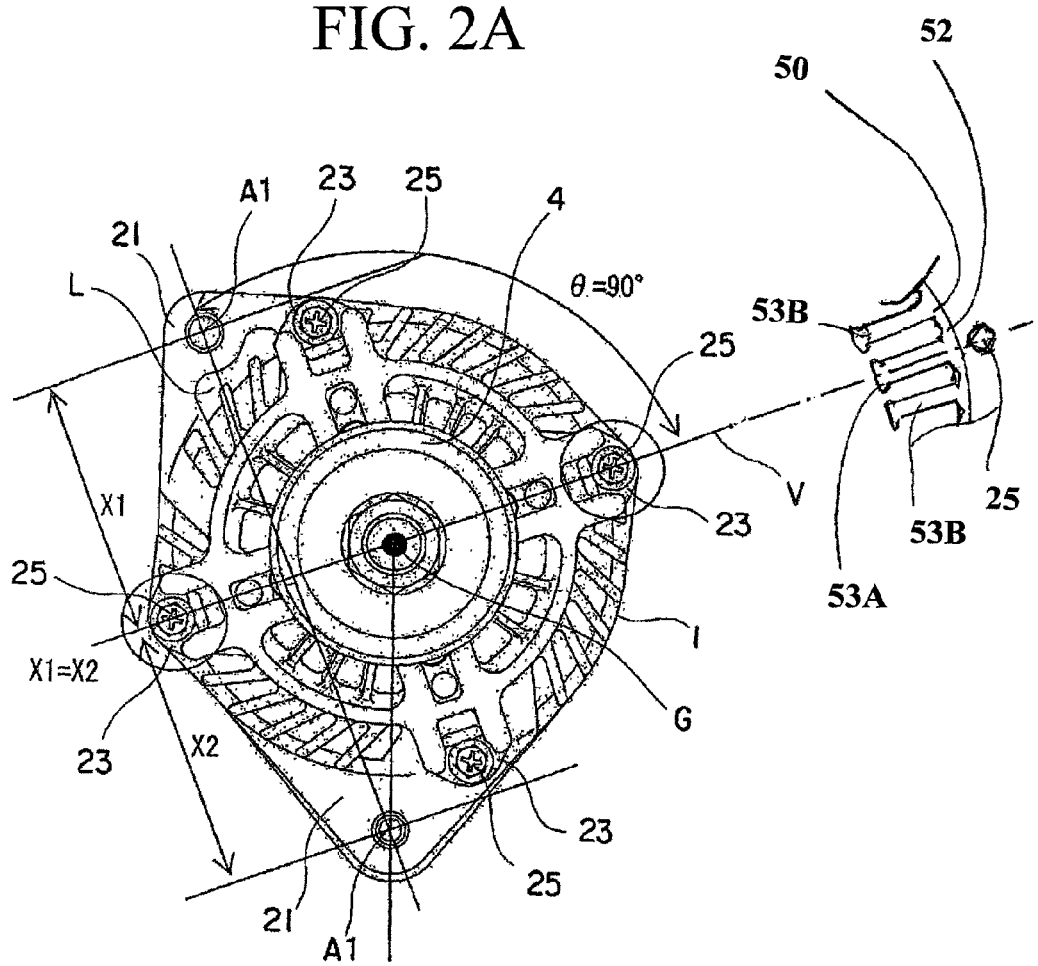
FIG. 2A is a diagram of the automotive alternator in FIG. 1 according to Embodiment 2 of the present invention.

Slots 54 of the stator core 50 are formed by disposing the wide teeth 53A and the narrow teeth 53B alternately. The slots 54 are formed such that pitches C1 and C2 between center lines of opening portions that extend radially alternate repeatedly between 5.42 mechanical degrees and 4.58 mechanical degrees. Bolts 25 that are positioned on an approximate perpendicular bisector V of a straight line L that connects centers of a pair of penetrating apertures A1 are disposed on radial center lines of the wide teeth 53A (see FIG. 2A).

The rest of the configuration is similar to that of Embodiment 1.

In this embodiment, because the pitches C1 and C2 between the center lines of each of the slots 54 are formed so as to be nonuniform, 12f components of magnetic vibrational force, which are harmonics that are extremely unpleasant to the ear, are canceled out as described in Japanese Patent No. 3,490,659 (Specification), which was applied for and registered by the applicants of the present invention.

Because the bolts 25, which are fastened in bolt fastening portions 23 that displace maximally in an axial direction of the shaft 6 on a perpendicular bisector V, are disposed on radial center lines of the very rigid wide teeth 53A, the stator core 19 can be held firmly by the brackets 1 and 2.

Moreover, in this embodiment, an alternator in which the number of slots is 72 and the number of magnetic poles is twelve poles has been explained, but a generator in which the number of slots is 96 and the number of magnetic poles is sixteen poles, or a generator in which the number of slots is 120 and the number of magnetic poles is twenty poles may also be used.

A generator in which the number of slots is three per phase per pole may also be used.

In each of the above embodiments, an automotive alternator in which a pair of stays 21 and 21 were formed on the front bracket 1 and a single stay 22 was formed on the rear bracket 2 has been explained, but the present invention can also be applied to an alternator in which a pair of stays are formed on the rear bracket.

In addition, the generator is not limited to automotive use, and the present invention can also be applied to electric motors, which are also dynamoelectric machines.

What is claimed is:

1. A dynamoelectric machine comprising:
   a shaft;
   a rotor that is fixed to said shaft;
   a stator that has a stator core that is disposed so as to surround an outer circumference of said rotor and in which a plurality of slots that extend axially are formed so as to be spaced apart circumferentially; and
   a first bracket and a second bracket that hold circumferential edge portions of said stator core from two axial ends using a plurality of holding means and that envelope said stator core,
   a pair of first stays that are formed on said first bracket being fixed to a mount body by a fastening means that penetrates through a pair of penetrating apertures that are respectively formed on said first stays,
   said dynamoelectric machine being characterized in that:
   said pair of penetrating apertures are formed at positions such that an approximate perpendicular bisector of a straight line that connects centers of said penetrating apertures intersects an axis of said shaft; and
   one of said holding means is disposed on said perpendicular bisector near said shaft, and
   wherein said first bracket and said second bracket are disposed at a position such that an approximate perpendicular bisector of said penetrating apertures that are formed on said first stays that is constituted by a straight line that joins a penetrating aperture formed on a second stay that faces one of said penetrating apertures, intersects a center of gravity of said dynamoelectric machine,
   wherein said stator core is formed such that said slots are greater than or equal to two slots per phase per pole in number, and pitches between radial center lines of opening portions of respective adjacent slots are formed at a nonuniform pitch by changing circumferential width dimensions of teeth that define said slots; and
   said holding means that is disposed on said perpendicular bisector near said shaft is disposed on a radial center line of a wide tooth.

2. A dynamoelectric machine according to claim 1, characterized in that said holding means are disposed at a uniform angular pitch circumferentially.

3. A dynamoelectric machine according to claim 1, wherein the pair of first stays are integral with the first bracket.

* * * * *